Patented Sept. 7, 1926.

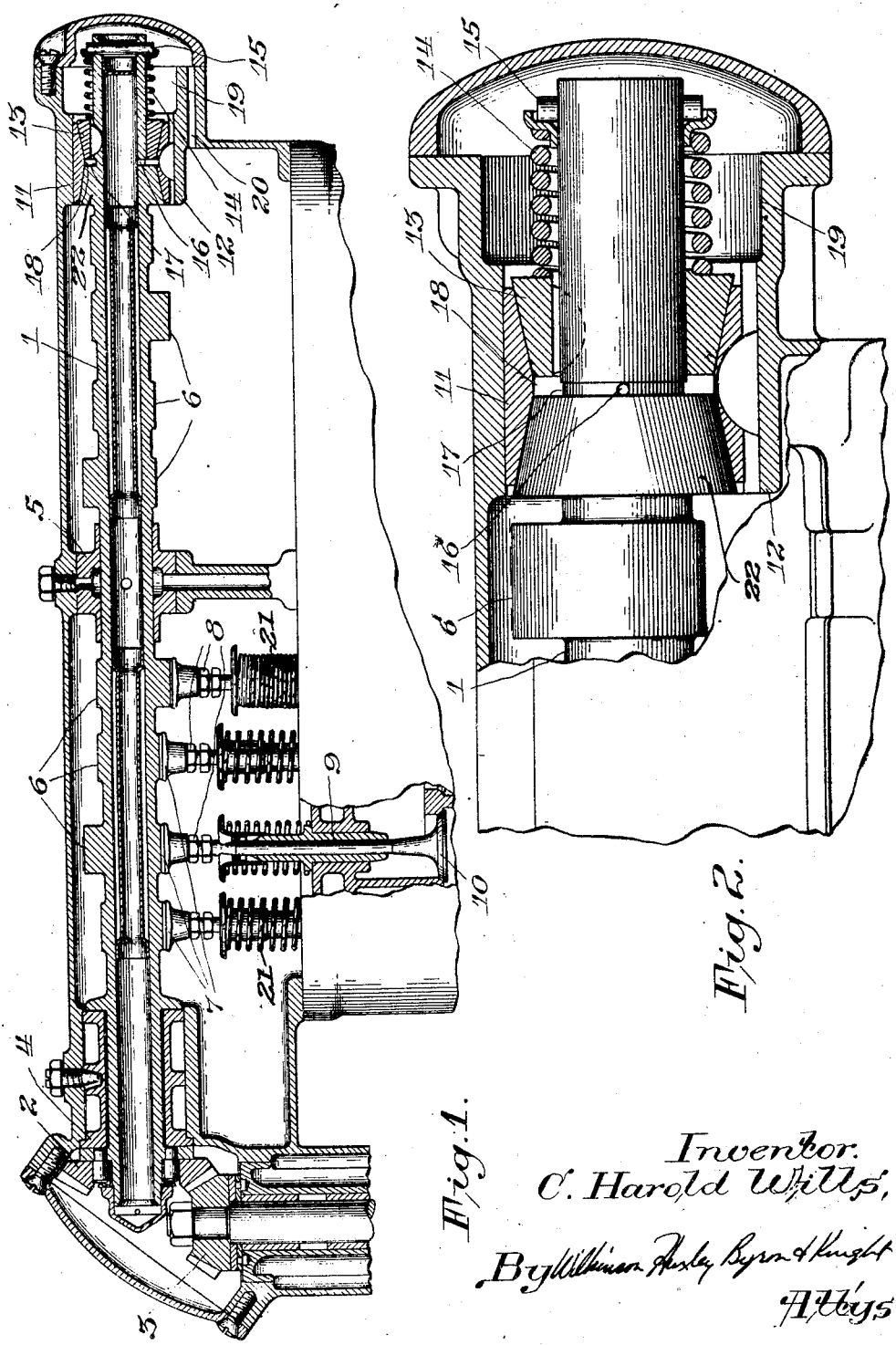

1,598,839

UNITED STATES PATENT OFFICE.

CHILDE HAROLD WILLS, OF MARYSVILLE, MICHIGAN.

SHAFT-RETARDING MEANS.

Application filed November 12, 1920. Serial No. 423,683.

The objects of this invention are to provide means to automatically exert a drag or retarding action upon rotating shafts, to prevent gear noise caused by back lash due to the reaction effect of the valves on the cam shaft of a hydrocarbon motor, to obtain this result by means constituting a bearing for the cam shaft, and to utilize such construction as a self-regulable oil feed device responsive to the speed of the shaft.

The invention is embodied in preferable form in the construction and arrangement hereinafter described and illustrated in the accompanying drawings, in which drawings—

Figure 1 is a longitudinal central section of part of a hydrocarbon motor including a cam shaft and showing my invention applied to the latter, and Fig. 2 an enlarged section through the retarder bearing showing the shaft in elevation.

Referring to the drawings, 1 is a shaft which in the particular embodiment of the invention here illustrated is the cam shaft of a hydrocarbon motor. 2 is a driven gear secured to one end of this shaft and driven by a driving gear 3. 4 are thrust bearings at this end of the shaft. This end of the shaft takes substantially all the thrust. 5 is a central bearing for the shaft. Formed on the shaft are cams 6 for operating the followers 7 which engage the tappets 8 on the ends of the valve stems 9 of valves 10. The valve stems are urged upwardly by springs 21. At the end of the shaft opposite to that to which the gear 2 is secured is mounted in the housing the third bearing which embodies the invention. This construction comprises two cone-shaped members, an outer member 11 preferably formed of bronze and having a double cone face with the two parts of the face meeting at a central apex and keyed to the casing 12 in which the shaft is mounted a cone member 22 formed integrally with the shaft 1, or fixedly secured thereto, and an inner steel cone 13 tapered on its outer side and keyed to the shaft but capable of slight longitudinal movement thereon. A spring 14 surrounds the shaft and bears at one end against the outer end of the steel cone member 13, and at the other end against a washer retained by the pin 15 affixed to the end of the shaft. An oil hole 16 leads through the hollow cam shaft to a channel 17 communicating with an annular chamber 18 opposite the end of the member 13. The oil from this chamber is forced to pass between the surfaces of the two cone members. The oil passes from between the inner ends of the cones directly into the cam shaft housing, and from the outer ends into the space 19 and thence by channel 20 to the housing.

In the usual operation of internal combustion engines, when the engine is running at low speeds the return movement of the valves caused by the springs will cause the valve followers to strike against the near sides of the cams, and thus cause the driven gear of the cam shaft to overrun the gear on the driving shaft, thus causing noise due to back lash of the gears. In this invention, at low speeds the pressure of the spring 14 will press the tapered steel bearing member 13 against or toward the correspondingly tapered or wedge-shaped face of the outer bronze member 11 with sufficient force to exert such a retarding effect or drag on the cam shaft as to prevent its driven gear 2 from overrunning the driving gear 3. The relatively soft metal of the outer cone member 11 increases the friction between the cones.

As the speed increases the differential peripheral speed resulting from the high peripheral speed at the outer ends of the cones, which is greater than the speed of the inner, small ends, will impart a sufficiently increased centrifugal force to the oil to induce an increased flow of oil between the cones, thus decreasing the co-efficient of friction between these members and lessening the drag action to such an extent that the shaft rotates substantially freely. The construction then becomes a bearing only.

Having thus described my invention, what I claim is:—

1. In combination with a shaft, driving means therefor, yielding retarding means for the shaft having an automatically decreasing retarding effect as the shaft increases in speed.

2. In combination with a rotating shaft, driving means therefor, yielding means for exerting a retarding drag upon the shaft at predetermined speeds and being operable to reduce said drag at higher speeds.

3. In combination with a shaft, means for rotating said shaft, a member operated by said shaft, means carried by the shaft for effecting such operation of said member intermittently, a return spring for said member, and retarding means for the shaft operable to prevent overrunning of the driving means by said shaft under the reaction effect of said spring.

4. In combination with a shaft, a casing therefor, a frictional member between said parts having differential peripheral speed, and means for introducing oil to the surface of said member at the point of its lowest speed.

5. In combination with a rotating shaft, a casing therefor, a member fixed to one of said parts having double cone faces, other cone members carried by the other part and fitting said faces, one of said latter members being yieldable, and means for admitting oil to the bearing surfaces of said members at the shortest diameter of said surfaces.

6. In a hydrocarbon motor, a cam shaft, valves, springs for the valve, and means for exerting a drag upon the cam shaft.

7. In a hydrocarbon motor, in combination with a cam shaft, a driven gear for said shaft at one end thereof, a bearing for said shaft adjacent said end, a central bearing for said shaft and a third bearing at the other end of the shaft, said third bearing including automatically yieldable retarding means for the shaft and a spring for forcing such retarding means into operative position.

8. In combination with a rotating shaft, a bearing for said shaft, means for feeding oil between the members of said bearing, and means for automatically supplying a greater quantity of oil to said members as the speed of the shaft increases.

9. In combination with a shaft, means for rotatably driving the same, a bearing for said shaft including conical members, means for yieldably pressing said members toward one another, and means for centrifugally feeding oil to said members whereby the rate of oil feed increases with the speed of the shaft.

10. In combination with a shaft, means for rotatably driving the same, a bearing for said shaft including interfitting conical members operable to produce a frictional drag on the shaft, and means for yieldably pressing said members together.

11. In combination with a rotating shaft, a bearing for said shaft including conical interfitting members of diverse metals operable to exert frictional drag on the shaft, a casing for said shaft, one of said members being affixed to the casing and the other to the shaft, and a spring pressing against one of said members.

12. In combination with a rotating shaft, a bearing for said shaft including interfitting conical frictional members, a spring pressing against one of said members, a circumferential oil channel in said shaft communicating with the space between said members, said shaft having an oil passage leading from the interior thereof to said channel.

Signed at Marysville, Michigan, this 19th day of October, 1920.

CHILDE HAROLD WILLS.